(12) United States Patent
Seri et al.

(10) Patent No.: US 11,215,769 B2
(45) Date of Patent: Jan. 4, 2022

(54) MPO LOCKING

(71) Applicant: MELLANOX TECHNOLOGIES, LTD., Yokneam (IL)

(72) Inventors: Hen Seri, Poria Kfar Avoda (IL); Andrey Ger, Shlomi (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 0 days.

(21) Appl. No.: 16/792,331

(22) Filed: Feb. 17, 2020

(65) Prior Publication Data

US 2020/0284999 A1 Sep. 10, 2020

Related U.S. Application Data

(60) Provisional application No. 62/814,872, filed on Mar. 7, 2019.

(51) Int. Cl.
*G02B 6/38* (2006.01)
*G02B 6/42* (2006.01)

(52) U.S. Cl.
CPC .......... *G02B 6/3893* (2013.01); *G02B 6/3821* (2013.01); *G02B 6/3831* (2013.01)

(58) Field of Classification Search
CPC ...... G02B 6/3821; G02B 6/38; G02B 6/4277; G02B 6/4293
(Continued)

(56) References Cited

U.S. PATENT DOCUMENTS 3,672,024 A 6/1972 Barr
3,773,360 A 11/1973 Timbers
(Continued)

FOREIGN PATENT DOCUMENTS

CN 201853849 U 6/2011
CN 201859987 U 6/2011
(Continued)

OTHER PUBLICATIONS

IEC 61754-7-2, "Fibre optic interconnecting devices and passive components—Fibre optic connector interfaces—Part 7-2: Type MPO connector family—Two fibre rows", edition 1.0, pp. 1-40, Dec. 13, 2017.
(Continued)

*Primary Examiner* — Kaveh C Kianni
(74) *Attorney, Agent, or Firm* — Kligler & Associates Patent Attorneys Ltd

(57) ABSTRACT

In one embodiment, an apparatus, includes an MPO connector including a main body including a connector interface to be reversibly connected to an MPO interface of an optical module, locking elements configured to lock the MPO connector with the optical module, a pull-to-release housing configured to expose the locking elements to allow removal of the MPO connector from the optical module, and an elongated channel, wherein the pull-to release housing and main body define a slot therebetween in which to retract the pull-to-release housing, and a T-shape locking key including a top section and a flexible elongated section extending from the top section, the elongated section configured to be inserted into the channel and the top section configured to rest in the slot so that retraction of the pull-to-release housing is restricted by the top section, thereby preventing unlocking of the MPO connector from the optical module.

15 Claims, 6 Drawing Sheets

(58) Field of Classification Search
USPC .......................................................... 385/77
See application file for complete search history.

(56) References Cited

U.S. PATENT DOCUMENTS

| | | | |
|---|---|---|---|
| 4,005,883 A | 2/1977 | Guest | |
| 4,669,797 A | 6/1987 | Bourdon | |
| 4,768,405 A | 9/1988 | Nickipuck | |
| 5,071,358 A | 12/1991 | Petrosky | |
| 5,176,343 A | 1/1993 | Cheney, II et al. | |
| 5,192,219 A | 3/1993 | Fowler et al. | |
| 5,389,000 A | 2/1995 | DiViesti et al. | |
| 5,509,750 A | 4/1996 | Boike | |
| 5,584,513 A | 12/1996 | Sweeny et al. | |
| 6,080,933 A | 6/2000 | Gretz | |
| 6,464,403 B1* | 10/2002 | Koch | G02B 6/3893 |
| | | | 385/139 |
| 6,830,464 B1 | 12/2004 | Friend | |
| 6,857,900 B2 | 2/2005 | Kleeberger et al. | |
| 7,090,523 B2 | 8/2006 | Shirk et al. | |
| 7,466,891 B2 | 12/2008 | Wagner et al. | |
| 7,530,605 B2 | 5/2009 | Rigollet et al. | |
| 7,758,370 B1 | 7/2010 | Flaherty | |
| 7,862,366 B2 | 1/2011 | Stone et al. | |
| 7,963,570 B2 | 6/2011 | Swift | |
| 8,231,282 B2 | 7/2012 | Kuffel et al. | |
| 8,378,241 B1 | 2/2013 | Cuppett | |
| 8,500,339 B2 | 8/2013 | Lee | |
| 8,547,059 B2 | 10/2013 | Kurumizawa et al. | |
| 8,662,540 B2 | 3/2014 | Whitener | |
| 8,740,637 B2 | 6/2014 | Wang et al. | |
| 8,851,763 B2 | 10/2014 | Lin et al. | |
| 9,075,205 B2 | 7/2015 | Pepe et al. | |
| 9,124,031 B2 | 9/2015 | Su et al. | |
| 9,425,541 B2 | 8/2016 | Data et al. | |
| 9,477,049 B2 | 10/2016 | Gniadek et al. | |
| 9,500,817 B2 | 11/2016 | Coffey et al. | |
| 9,618,702 B2 | 4/2017 | Takano et al. | |
| 9,755,382 B2 | 9/2017 | Gniadek | |
| 9,810,858 B2 | 11/2017 | Gniadek et al. | |
| 9,907,616 B1* | 3/2018 | Fried | G02B 6/24 |
| 9,929,504 B2 | 3/2018 | Bauer et al. | |
| 9,995,887 B2 | 6/2018 | Peterson | |
| 10,520,685 B2* | 12/2019 | Watanabe | G02B 6/3821 |
| 2005/0124200 A1 | 6/2005 | Nudd et al. | |
| 2005/0189764 A1 | 9/2005 | Ono | |
| 2006/0108801 A1 | 5/2006 | Grosch | |
| 2007/0160327 A1* | 7/2007 | Lewallen | G02B 6/3885 |
| | | | 385/53 |
| 2008/0057770 A1 | 3/2008 | Caveney et al. | |
| 2008/0131055 A1 | 6/2008 | Parkman et al. | |
| 2008/0309079 A1 | 12/2008 | Pedersen et al. | |
| 2010/0027955 A1* | 2/2010 | Parikh | G02B 6/4477 |
| | | | 385/135 |
| 2012/0040549 A1 | 2/2012 | Bychkov et al. | |
| 2012/0141070 A1 | 6/2012 | Sabo | |
| 2012/0177335 A1* | 7/2012 | Lee | G02B 6/389 |
| | | | 385/136 |
| 2012/0213478 A1* | 8/2012 | Chen | G02B 6/381 |
| | | | 385/62 |
| 2015/0155645 A1 | 6/2015 | Hara et al. | |
| 2015/0177467 A1* | 6/2015 | Gniadek | H01R 13/623 |
| | | | 385/58 |
| 2016/0177677 A1* | 6/2016 | Gonzalez | H02G 9/10 |
| | | | 166/351 |
| 2016/0259135 A1* | 9/2016 | Gniadek | G02B 6/3885 |
| 2016/0356098 A1 | 12/2016 | Ward et al. | |
| 2017/0139158 A1* | 5/2017 | Coenegracht | G02B 6/3821 |
| 2017/0184798 A1* | 6/2017 | Coenegracht | G02B 6/3849 |
| 2017/0192182 A1* | 7/2017 | Peterson | G02B 6/3825 |
| 2017/0285277 A1 | 10/2017 | Chang et al. | |
| 2018/0329152 A1* | 11/2018 | Verheyden | G02B 6/4471 |
| 2019/0170961 A1* | 6/2019 | Coenegracht | G02B 6/4444 |
| 2019/0227244 A1* | 7/2019 | Huang | G02B 6/3825 |
| 2020/0183093 A1* | 6/2020 | Chang | G02B 6/3831 |
| 2020/0228166 A1* | 7/2020 | Scherer | H04B 5/0037 |

FOREIGN PATENT DOCUMENTS

| | | |
|---|---|---|
| DE | 10326834 A1 | 12/2004 |
| EP | 2872939 A2 | 5/2015 |
| GB | 2487266 A1 | 7/2012 |
| JP | H1138278 A | 2/1999 |
| JP | 2006337637 A * | 12/2006 |
| WO | 1981000747 A1 | 3/1981 |

OTHER PUBLICATIONS

TIA 604-5, "FOCIS 5 Fiber Optic Connector Intermateability Standard—Type MPO", pp. 1-36, Mar. 2019.
IEC 61754-7 cant file.
TIA 604-5 cant find.

* cited by examiner

MPO LOCKING

RELATED APPLICATION INFORMATION

The present application claims benefit of U.S. Provisional Patent Application Ser. 62/814,872 of Seri, et al., filed Mar. 7, 2019, the disclosure of which is hereby incorporated herein by reference.

FIELD OF THE INVENTION

The present invention relates to optical connectors, and in particular, but not exclusively to, MPO-type connectors.

BACKGROUND

Multi-fiber Push On (MPO) is a type of optical connector that is commonly used in high-speed telecom and data communications networks. MPO has been standardized within the IEC 61754-7 and TIA 604-5.

MPO connectors generally include a locking mechanism to maintain connection between the MPO connector and an optical module. Easy-release of the MPO connector from the optical module may be implemented using a pull-to-release mechanism.

SUMMARY

There is provided in accordance with another embodiment of the present disclosure, a multi-fiber push-on (MPO) connector apparatus, including an MPO connector including a main body configured to accept an optical fiber therein, and including a connector interface configured to be reversibly connected to an MPO interface of an optical module, a locking mechanism including locking elements configured to lock the MPO connector with the optical module, and a pull-to-release housing configured to expose the locking elements to allow removal of the MPO connector from the optical module, and an elongated channel, wherein the pull-to release housing and the main body define a slot therebetween in which to retract the pull-to-release housing, and a T-shape locking key including a top section and a flexible elongated section extending from the top section, the flexible elongated section being configured to be inserted into the elongated channel and the top section of the T-shape locking key being configured to rest in the slot so that retraction of the pull-to-release housing is restricted by the top section of the T-shape locking key, thereby preventing unlocking of the MPO connector from the optical module.

Further in accordance with an embodiment of the present disclosure the pull-to-release housing is spring-loaded.

Still further in accordance with an embodiment of the present disclosure the elongated channel includes sides, a top, and a bottom, the sides and top being defined by the pull-to-release housing, and the bottom being defined by the main body.

There is also provided in accordance with still another embodiment of the present disclosure, a method to secure a multi-fiber push-on (MPO) connector in an optical module, the method including connecting the MPO connector to the optical module causing locking of the MPO connector with the optical module, inserting a flexible elongated section of a T-shape locking key into an elongated channel of the MPO connector, and restricting retraction of a pull-to-release housing of the MPO connector into a slot defined between a main body of the MPO connector and the pull-to release housing by resting a top section of the T-shape locking key in the slot thereby preventing unlocking of the MPO connector from the optical module.

Additionally, in accordance with an embodiment of the present disclosure, the method includes removing the T-shape locking key from the slot and the elongated channel, retracting the pull-to-release housing and unlocking the MPO connector from the optical module, and removing the MPO connector from the optical module.

Moreover, in accordance with an embodiment of the present disclosure the unlocking includes exposing locking elements of the MPO connector.

Further in accordance with an embodiment of the present disclosure the connecting includes connecting a connector interface of the main body with an MPO interface of an optical module.

Still further in accordance with an embodiment of the present disclosure the pull-to-release housing is spring-loaded.

BRIEF DESCRIPTION OF THE DRAWINGS

The present invention will be understood from the following detailed description, taken in conjunction with the drawings in which.

DESCRIPTION OF EXAMPLE EMBODIMENTS

Overview

As previously mentioned, MPO connectors generally include a locking mechanism to maintain connection between the MPO connector and an optical module. Easy-release of the MPO connector from the optical module may be implemented using a pull-to-release mechanism. In some installations the pull-to-release mechanism may prove to be problematic resulting in accidental release of the MPO connector from the optical module or even purposeful release by an inexperienced end-user.

Embodiments of the present invention provide an MPO connector with a T-shape locking key, which is inserted into the MPO connector to prevent accidental release of the MPO connector from the optical module or even reduce the chance of purposeful release by an inexperienced end-user.

In some embodiments, the MPO connector includes a locking mechanism having a pull-to-release housing (which may be spring loaded) which exposes locking elements allowing removal of the MPO connector from the optical module. The MPO connector includes an elongated channel generally surrounded on its sides and top by the pull-to-release housing and on its bottom by a main body of the MPO connector. The pull-to-release housing and the main body define a slot therebetween in which to retract the pull-to-release housing.

After the MPO connector is inserted in, and locked with, the optical module, the T-shape locking key is inserted into the MPO connector as follows. A flexible elongated section (the leg of the T) of the T-shape locking key is inserted into the elongated channel of the MPO connector and the top section (the top-bar of the T) of the T-shape locking key is placed to rest in the slot between the housing and the pull-to-release housing so that retraction of the pull-to-release housing is restricted by the top section of the T-shape locking key which is resting in the slot, thereby preventing unlocking of the MPO connector from the optical module.

The T-shape locking key may be removed from the MPO connector to enable unlocking and removal of the MPO connector from the optical module. However, due to the flat design of the T-shape locking key, and the fact that the flexible elongated section is inserted into, and surrounded by, the elongated channel, the T-shape locking key is unlikely to be removed accidentally.

System Description

Documents incorporated by reference herein are to be considered an integral part of the application except that, to the extent that any terms are defined in these incorporated documents in a manner that conflicts with definitions made explicitly or implicitly in the present specification, only the definitions in the present specification should be considered.

Figure 1:
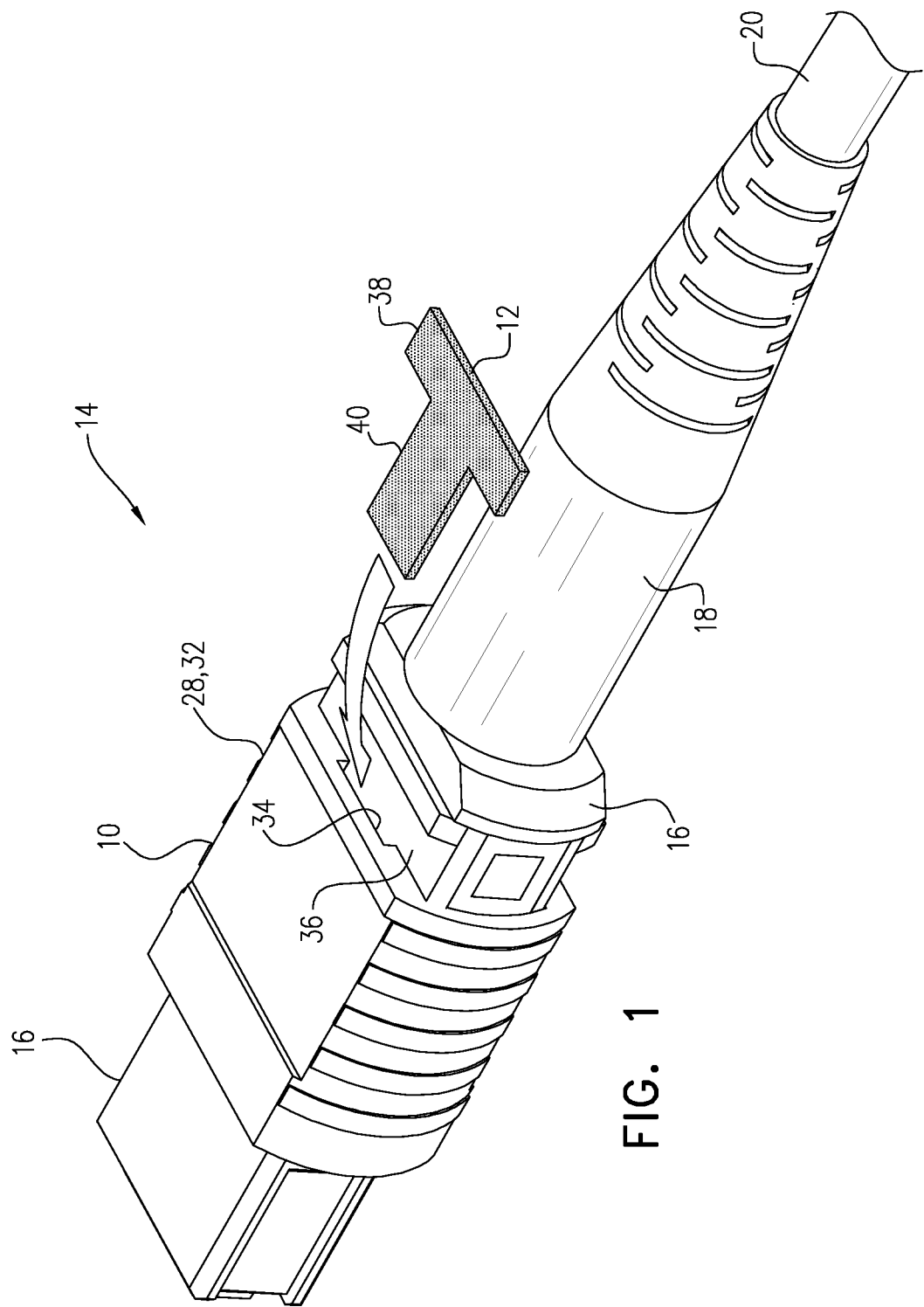
FIG. 1 is a schematic view of an MPO connector and a T-shape locking key constructed and operative in accordance with an embodiment of the present invention.
Figure 2:
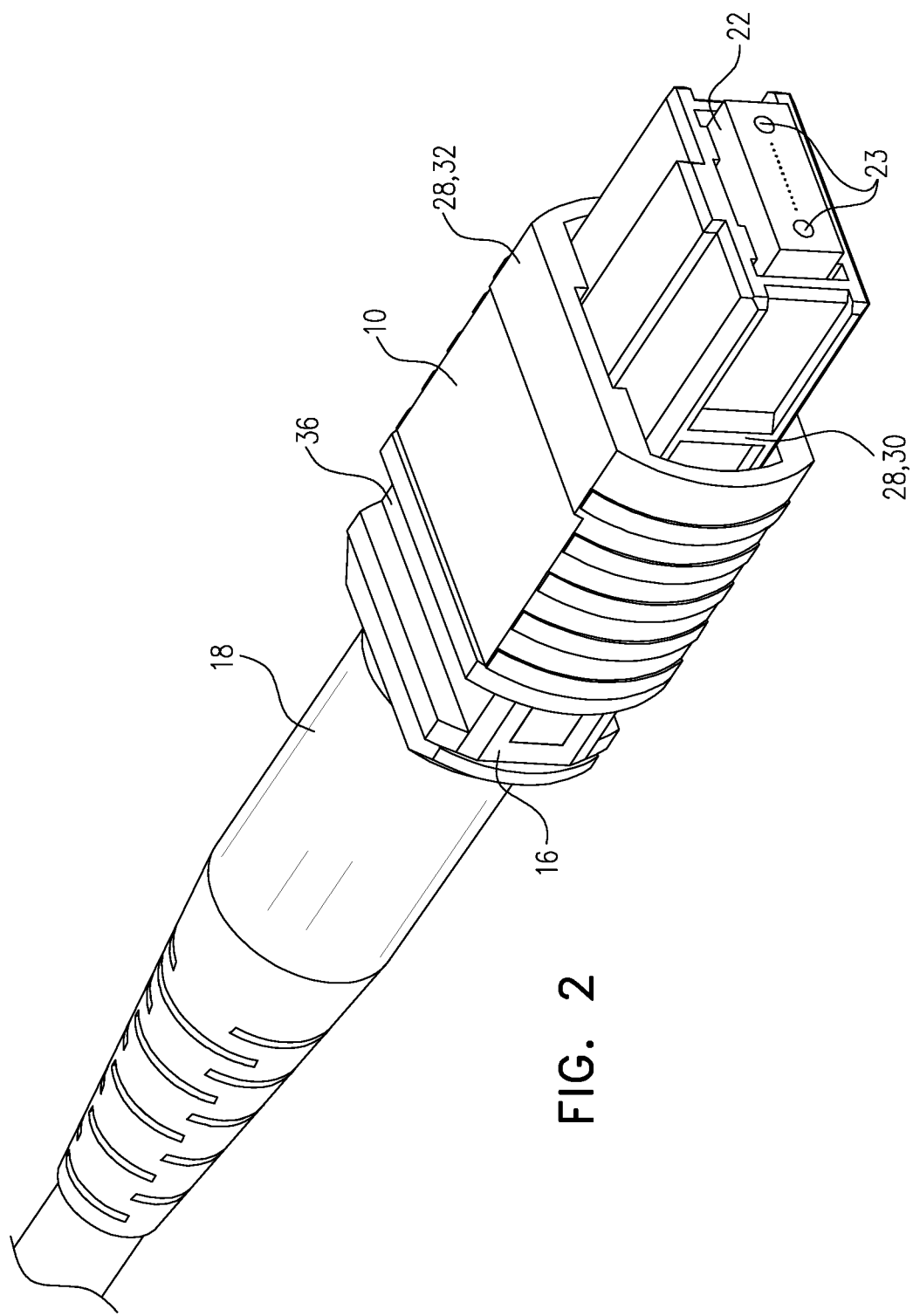
FIG. 2 is a schematic view of the MPO connector of FIG. 1 from a different angle.
Figure 3:
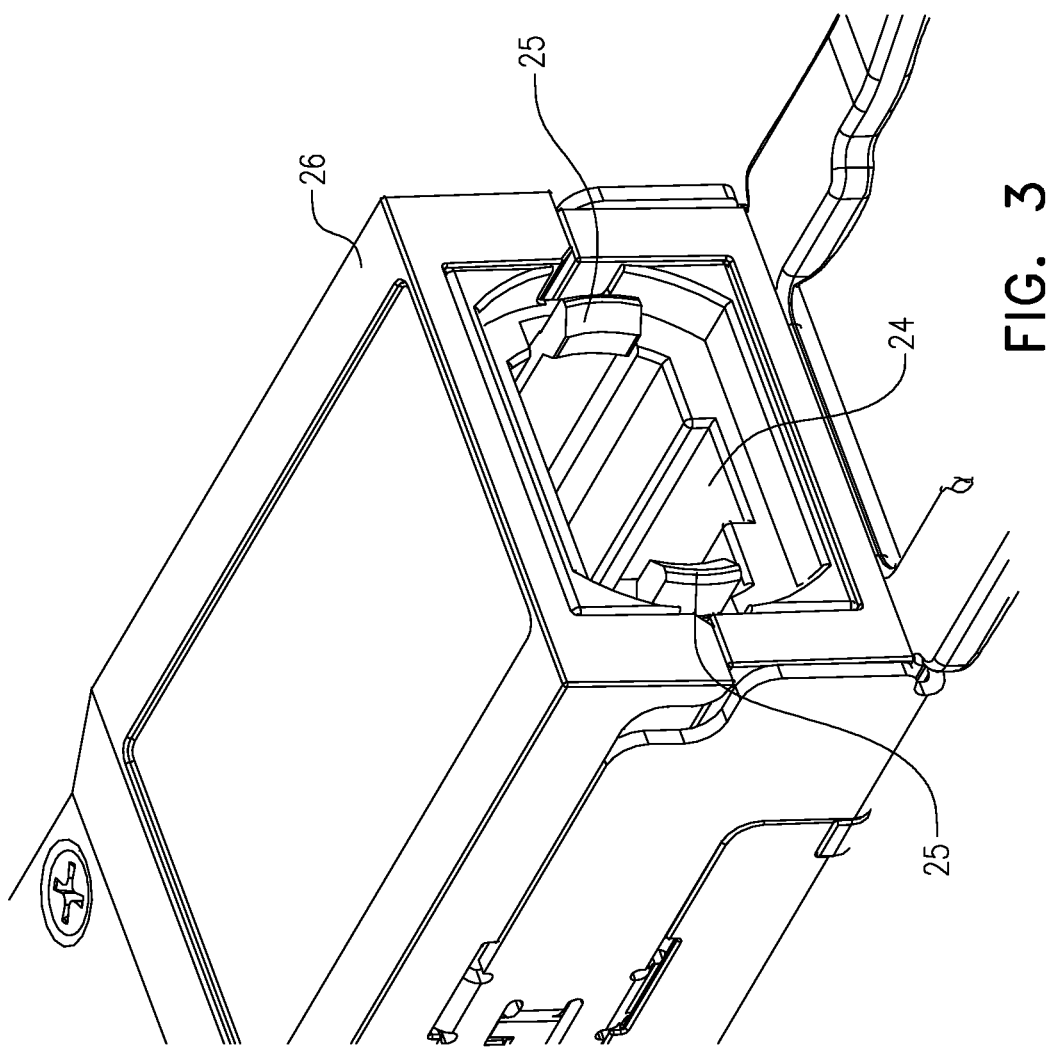
FIG. 3 is a schematic view of an optical module into which the MPO connector is inserted.

Reference is now made to FIG. 1, which is a schematic view of an MPO connector 10 and a T-shape locking key 12 constructed and operative in accordance with an embodiment of the present invention. Reference is also made to FIGS. 2 and 3. FIG. 2 is a schematic view of the MPO connector 10 of FIG. 1 from a different angle. FIG. 3 is a schematic view of an optical module 26 into which the MPO connector 10 is inserted.

The MPO connector 10 includes a main body 16. The main body 16 includes a boot 18 configured to accept an optical fiber 20 therein, and a connector interface 22, which may include alignment pins or holes 23, configured to be reversibly connected to an MPO interface 24 of an optical module 26.

The MPO connector 10 also includes a locking mechanism 28 including locking elements 30 and a pull-to-release housing 32, which optionally may be spring-loaded. The locking elements 30 with the pull-to-release housing 32 are configured to lock the connector interface 22 of the MPO connector 10 with the MPO interface 24 of the optical module 26, as described in more detail below.

The locking elements 30 are typically protrusions at the side of the main body 16. Inserting the connector interface 22 of the MPO connector 10 into the MPO interface 24 typically causes the locking elements 30 to engage with spring-loaded latches 25 of the optical module 26. The pull-to-release housing 32 is configured to rest in the MPO interface 24 around the latches 25 of the MPO interface 24 thereby preventing release of the latches 25 from around the locking elements 30 and thereby locking the connector interface 22 of the MPO connector 10 with the MPO interface 24 preventing release of the MPO connector 10 from the optical module 26. The pull-to-release housing 32 is configured to expose the locking elements 30, upon retraction of the pull-to-release housing 32, thereby allowing the latches 25 to release and allow removal of the MPO connector 10 from the optical module 26. The MPO connector 10 includes an elongated channel 34 having sides, a top, and a bottom. The sides and top are defined by the pull-to-release housing 32, and the bottom is defined by the main body 16. The pull-to-release housing 32 and the main body 16 define a slot 36 therebetween in which to retract the pull-to-release housing 32. The T-shape locking key 12 including a top section 38 (e.g., the top bar of the T-shape) and a flexible elongated section 40 extending from the top section 38 (e.g., the leg of the T-shape).

Figure 4:
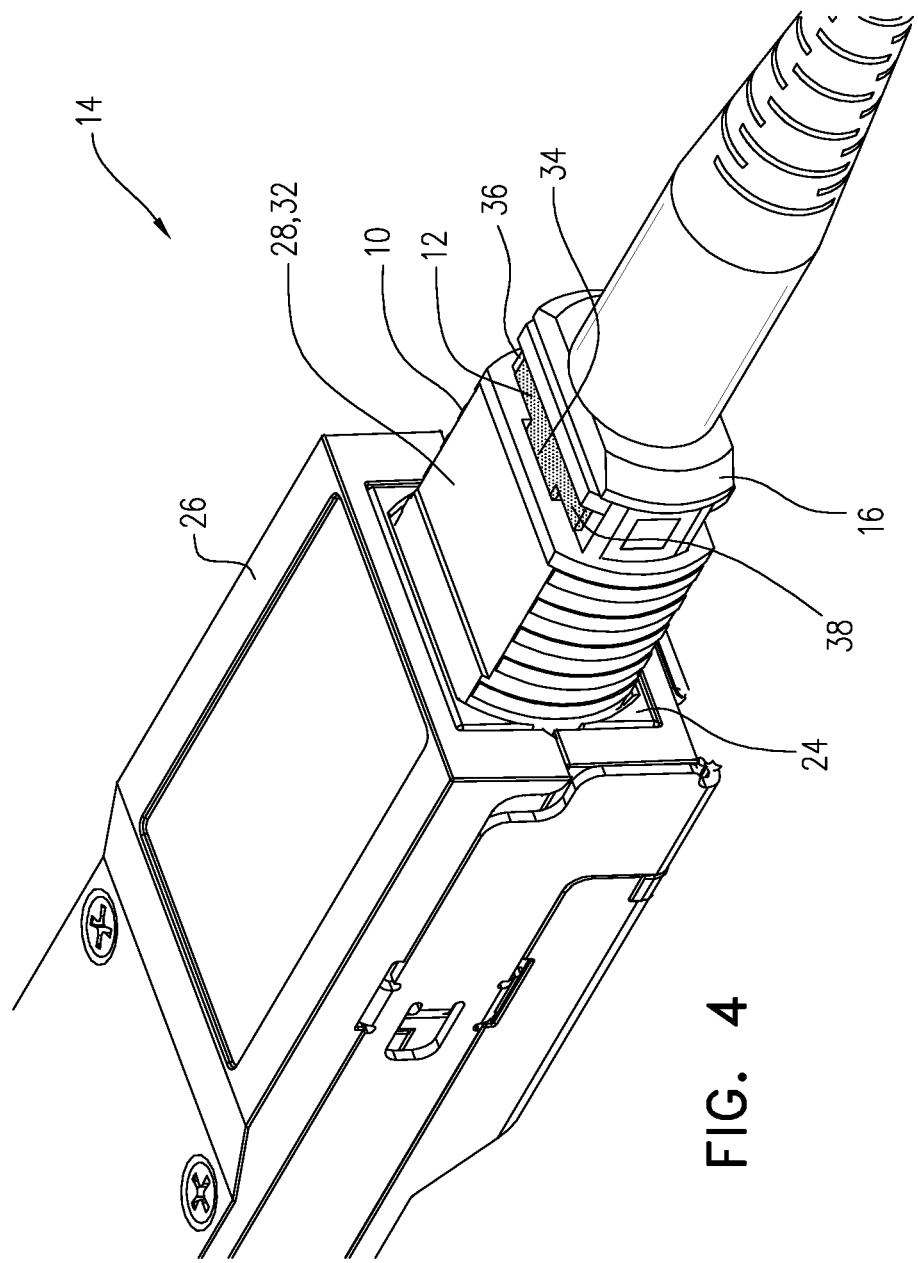
FIGS. 4 and 5 are schematic views of the MPO connector with the T-shape locking key disposed therein.
Figure 5:
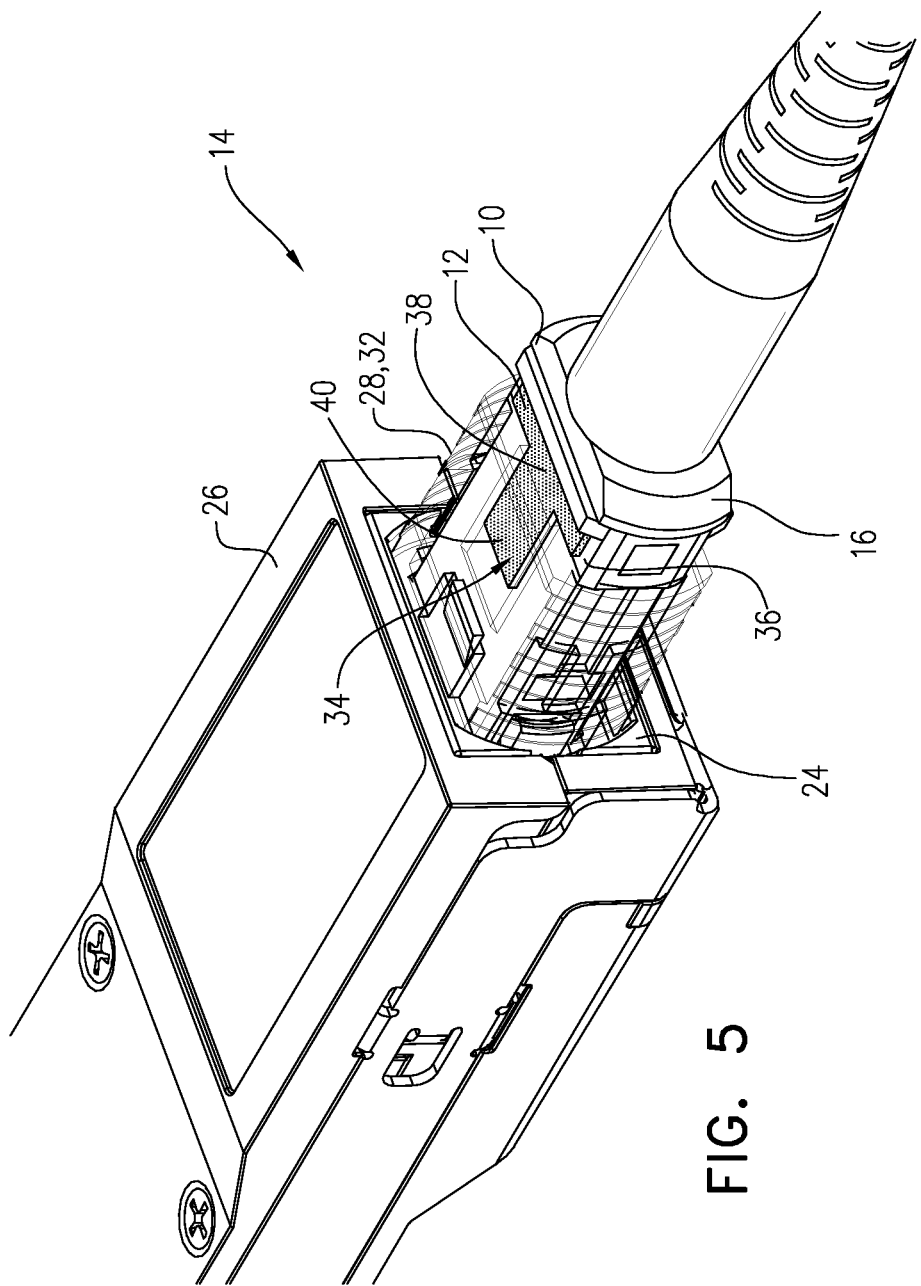

Reference is now made to FIGS. 4 and 5, which are schematic views of the MPO connector 10 with the T-shape locking key 12 disposed therein.

After the MPO connector 10 is inserted in, and locked with, the optical module 26, the T-shape locking key 12 is inserted into the MPO connector 10 as follows. The flexible elongated section 40 of the T-shape locking key 12 is inserted into the elongated channel 34 and the top section 38 of the T-shape locking key 12 is placed to rest in the slot 36 so that retraction of the pull-to-release housing 32 is restricted by the top section 38 of the T-shape locking key 12 which is resting in the slot 36, thereby preventing unlocking of the MPO connector 10 from the optical module 26.

The T-shape locking key 12 may be removed from the MPO connector 10 to enable unlocking and removal of the MPO connector 10 from the optical module 26. However, due to the flat design of the T-shape locking key 12, and the fact that the flexible elongated section 40 is inserted into, and surrounded by, the elongated channel 34, the T-shape locking key 12 is unlikely to be removed accidentally.

The T-shape locking key 12 may be formed from any suitable material or combination of materials, for example, but not limited to, any one or more of the following: a plastic such as acrylonitrile butadiene styrene (ABS), nylon, Polyetherimide (PEI), or a metal such as stainless steel or a copper alloy. The thickness of the T-shape locking key 12 may be any suitable thickness so that the flexible elongated section 40 may be inserted into the elongated channel 34 but the T-shape locking key 12 as a whole provides enough support against retraction of the pull-to-release housing 32. For example, the thickness of the T-shape locking key 12 may be in the range of 0.2 to 0.6 mm. The top section 38 of the T-shape locking key 12 may have any suitable dimensions to fit in the slot 36 and prevent unlocking of the MPO connector 10 from the optical module 26. The flexible elongated section 40 may have any suitable dimensions to fit in the elongated channel 34.

Figure 6B:
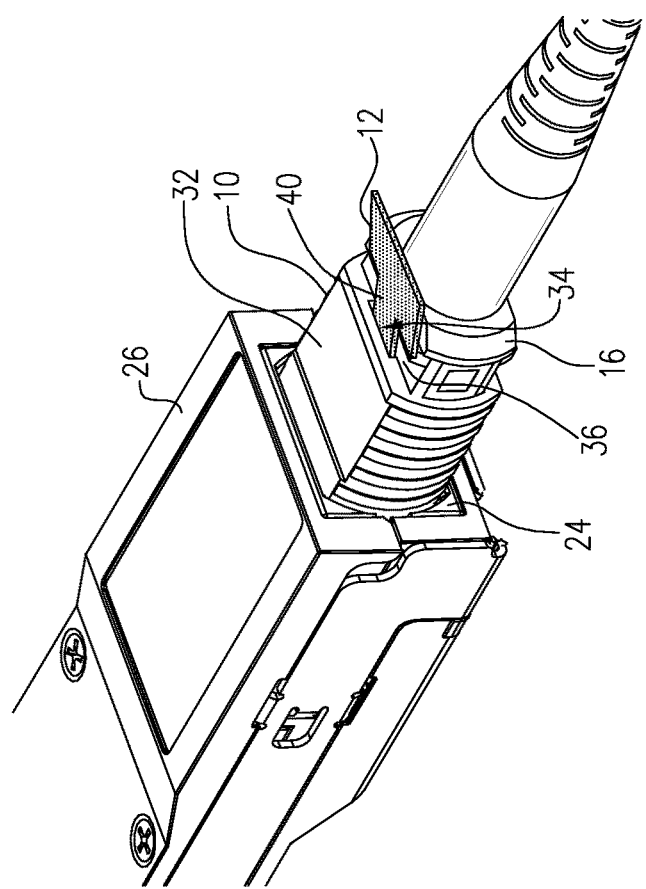
FIGS. 6A-B are schematic views of the T-shape locking key being inserted into the MPO connector.
Figure 6A:
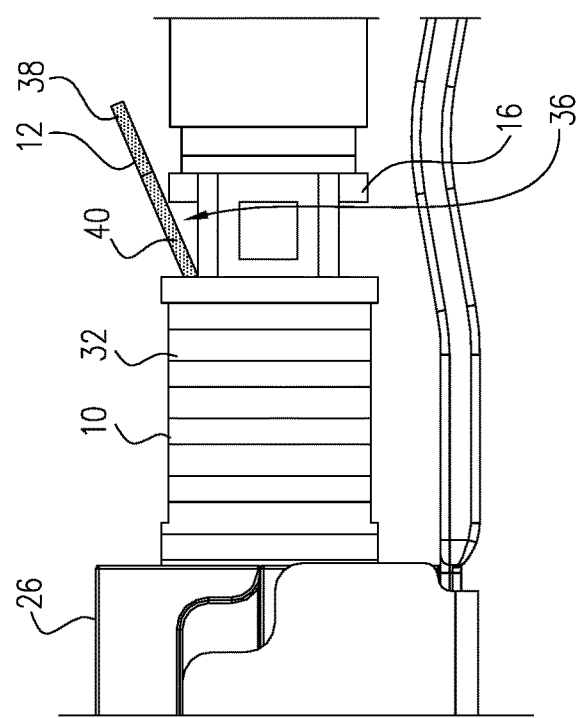

FIGS. 6A-B are views of the T-shape locking key 12 being inserted into the MPO connector 10. 1. FIGS. 6A-B illustrate part of a method to secure the MPO connector 10 in the MPO adapter 26.

The method includes connecting the MPO connector 10 to the optical module 26 causing locking of the MPO connector 10 with the optical module 26. The method includes inserting the flexible elongated section 40 of the T-shape locking key 12 into the elongated channel 34 of the MPO connector 10, for example, using tweezers. The method includes restricting retraction of the pull-to-release housing 32 of the MPO connector 10 into the slot 36 defined between the main body 16 of the MPO connector 10 and the pull-to release housing 32 by pushing the top section 38 of the T-shape locking key 12 into the slot 36 so that the top section 38 of the T-shape locking key 12 is resting in the slot 36 thereby preventing unlocking of the MPO connector 10 from the optical module 26.

The MPO connector 10 may be removed from the optical module 26 by performing the following steps: removing the T-shape locking key 12 from the slot 36 and the elongated channel 34 (for example, with the aid of tweezers or a similar tool); retracting the pull-to-release housing 32 which causes unlocking the MPO connector 10 from the optical module 26; and removing the MPO connector 10 from the optical module 26. In some embodiments, the unlocking step includes exposing the locking elements 30 (FIG. 2) of the locking mechanism 28 (FIG. 2) of the MPO connector 10, by retracting the pull-to-release housing 32

Various features of the invention which are, for clarity, described in the contexts of separate embodiments may also be provided in combination in a single embodiment. Conversely, various features of the invention which are, for brevity, described in the context of a single embodiment may also be provided separately or in any suitable sub-combination.

The embodiments described above are cited by way of example, and the present invention is not limited by what has been particularly shown and described hereinabove. Rather the scope of the invention includes both combinations and subcombinations of the various features described hereinabove, as well as variations and modifications thereof which would occur to persons skilled in the art upon reading the foregoing description and which are not disclosed in the prior art.

What is claimed is:

1. A multi-fiber push-on (MPO) connector apparatus, comprising:
   an MPO connector comprising:
   a main body configured to accept an optical fiber therein, and including: a connector interface configured to be reversibly connected to an MPO interface of an optical module; a front section configured to be inserted into a socket of the optical module; a rear section; and a rail extending along the main body from the front section towards the rear section; and
   a locking mechanism configured to lock the front section in the socket when the front section is inserted into the socket and including: locking elements configured to lock the MPO connector with the optical module; and a pull-to-release housing configured to expose the locking elements to allow removal of the MPO connector from the optical module, the pull-to-release housing comprising a ring fitted around the main body and containing an elongated channel configured to slide over the rail, and connected to the locking mechanism such that pulling the ring towards the rear section releases the locking mechanism and allows removal of the connector from the socket, and wherein the ring of the pull-to release housing and the rear section of the main body define a slot therebetween in which to retract the pull-to-release housing; and
   a T-shape locking key including a top section and a flexible elongated section extending from the top section and configured to be inserted into the elongated channel, such that when the elongated section is inserted into the channel, the top section of the T-shape locking key rests in the slot between the ring and the rear section of the main body, and engages the ring when the ring is pulled towards the rear section to prevent, and retraction of the pull-to-release housing is restricted by the top section of the T-shape locking key, to prevent unlocking of the front section of the main body of the MPO connector from the socket of the optical module.

2. The apparatus according to claim 1, wherein the pull-to-release housing is spring-loaded.

3. The apparatus according to claim 1, wherein the elongated channel includes sides, a top, and a bottom, the sides and top being defined by the pull-to-release housing, and the bottom being defined by the main body.

4. The apparatus according to claim 1, wherein the main body includes a boot configured to accept an optical fiber therein.

5. The apparatus according to claim 1, wherein the connector interface includes alignment pins.

6. The apparatus according to claim 1, wherein the connector interface includes alignment holes.

7. The apparatus according to claim 1, wherein the locking elements include protrusions at a side of the main body.

8. The apparatus according to claim 1, wherein the pull-to-release housing is configured to rest in the MPO interface around latches of the MPO interface thereby preventing release of the latches from around the locking elements and thereby locking the connector interface of the MPO connector with the MPO interface preventing release of the MPO connector from the optical module.

9. The apparatus according to claim 1, wherein T-shape locking key is formed from a plastic.

10. The apparatus according to claim 1, wherein T-shape locking key is formed from acrylonitrile butadiene styrene.

11. The apparatus according to claim 1, wherein T-shape locking key is formed from nylon.

12. The apparatus according to claim 1, wherein T-shape locking key is formed from Polyetherimide.

13. The apparatus according to claim 1, wherein T-shape locking key is formed from metal.

14. The apparatus according to claim 1, wherein T-shape locking key is formed from stainless steel or a copper alloy.

15. The apparatus according to claim 1, wherein T-shape locking key has a thickness in a range of 0.2 mm to 0.6 mm.

* * * * *